(12) United States Patent
Suffling

(10) Patent No.: US 8,793,780 B2
(45) Date of Patent: Jul. 29, 2014

(54) MITIGATION OF APPLICATION-LEVEL DISTRIBUTED DENIAL-OF-SERVICE ATTACKS

(75) Inventor: David Robert Suffling, Waterloo (CA)

(73) Assignee: BlackBerry Limited, Waterloo (CA)

( * ) Notice: Subject to any disclaimer, the term of this patent is extended or adjusted under 35 U.S.C. 154(b) by 289 days.

(21) Appl. No.: 13/083,981

(22) Filed: Apr. 11, 2011

(65) Prior Publication Data

US 2012/0260329 A1    Oct. 11, 2012

(51) Int. Cl.
*H04L 9/32* (2006.01)
(52) U.S. Cl.
USPC ............. 726/9; 726/3; 726/5; 726/6; 713/171
(58) Field of Classification Search
CPC .. H04L 63/08; H04L 63/0428; H04L 2209/80
USPC ............................................................ 726/9
See application file for complete search history.

(56) References Cited

U.S. PATENT DOCUMENTS

| | | | |
|---|---|---|---|
| 7,185,199 B2 | 2/2007 | Balfanz et al. | |
| 7,234,063 B1 | 6/2007 | Baugher et al. | |
| 7,392,387 B2 | 6/2008 | Balfanz et al. | |
| 7,627,901 B1 * | 12/2009 | Elliott | 726/26 |
| 7,743,404 B1 | 6/2010 | Deutschmann et al. | |
| 8,176,328 B2 * | 5/2012 | Chen et al. | 713/176 |
| 8,351,602 B2 * | 1/2013 | Huang et al. | 380/33 |
| 2002/0067832 A1 | 6/2002 | Jablon | |
| 2002/0174335 A1 | 11/2002 | Zhang et al. | |
| 2002/0178271 A1 | 11/2002 | Graham et al. | |
| 2005/0044356 A1 * | 2/2005 | Srivastava et al. | 713/163 |
| 2005/0149732 A1 | 7/2005 | Freeman et al. | |
| 2005/0210252 A1 * | 9/2005 | Freeman et al. | 713/171 |
| 2006/0174116 A1 * | 8/2006 | Balfanz et al. | 713/168 |
| 2006/0184681 A1 * | 8/2006 | Bernardi et al. | 709/229 |
| 2006/0282662 A1 | 12/2006 | Whitcomb | |
| 2007/0183382 A1 | 8/2007 | Passarella et al. | |
| 2007/0266241 A1 | 11/2007 | Wu et al. | |

(Continued)

FOREIGN PATENT DOCUMENTS

| | | |
|---|---|---|
| EP | 1965558 A1 | 9/2008 |
| WO | 2006127229 A2 | 11/2006 |

OTHER PUBLICATIONS

Extended Examination Search Report dated Sep. 6, 2011 from EP11161945.8.

(Continued)

*Primary Examiner* — Kambiz Zand
*Assistant Examiner* — Yonas Bayou
(74) *Attorney, Agent, or Firm* — Jenna L. Wilson; Dimock Stratton LLP

(57) ABSTRACT

A system and method, implementable using an authenticating device, are provided for authenticating requesting devices such as mobile devices and other communication devices over a network. At least one group shared secret is provisioned on a plurality of requesting devices, which are further provided with other authentication credentials such as a shared secret for full authentication by the authenticating device. When authentication is sought, the requesting device transmits a pre-authentication request comprising one of the group shared secrets to the authenticating device, which verifies that group shared secret. The group shared secrets may be stored in volatile memory at the authenticating device. If the group shared secret is verified, the authenticating device will authenticate that same device in response to a subsequent authentication request.

24 Claims, 7 Drawing Sheets

(56) References Cited

U.S. PATENT DOCUMENTS

| | | | |
|---|---|---|---|
| 2008/0092204 A1* | 4/2008 | Bryce et al. | 725/143 |
| 2008/0102797 A1* | 5/2008 | Coleman et al. | 455/411 |
| 2008/0212783 A1 | 9/2008 | Oba | |
| 2008/0216160 A1* | 9/2008 | Rollet | 726/6 |
| 2009/0110200 A1* | 4/2009 | Srinivas | 380/279 |
| 2010/0115278 A1* | 5/2010 | Shen et al. | 713/171 |
| 2010/0299313 A1 | 11/2010 | Orsini et al. | |
| 2011/0293093 A1* | 12/2011 | Sun et al. | 380/211 |

OTHER PUBLICATIONS

Qi Dong et al: "Pre-authentication filters", Proceedings of the First ACM Conference on Wireless Network Security, WISEC '08, Jan. 1, 2008, p. 2, XP55005740.

Sung-Hyung Lee et al: "Design of 1-15 Authentication Protocol for LR-WPAN using Pre-Authentication Mechanism", Consumer Communications and Networking Conference, 2009. CCNC 2009. 6th IEEE, IEEE, Piscataway, NJ, USA, Jan. 10, 2009, pp. 1-5, XP031425699.

Chan, H., Perrig, A., Song, D., "Random Key Predistribution Schemes for Sensor Networks", May 14, 2011, 2003 IEEE Symposium on Security and Privacy, 2003, pp. 197-213.

Wang, R., Du, W., Ning, P., "Containing Denial-of-Service Attacks in Broadcast Authentication in Sensor Networks", In MobiHoc '07: Proceedings of the 8th ACM international symposium on Mobile ad hoc networking and computing, Sep. 9-14, 2007, pp. 71-79.

Zhu, F., Mutka, M., Ni, L., "PrudentExposure: A Private and User-centric Service Discovery Protocol", Proceedings of the Second IEEE International Conference on Pervasive Computing and Communications (PerCom'04), Mar. 14-17, 2004, pp. 329-338.

Abdelsayed, S., et al., "An Efficient Filter for Denial-of-Service Bandwidth Attacks", In IEEE Global Telecommunications Conference(GLOBECOM'03), 2003, vol. 3, pp. 1353-1357.

deVries, S., "A Corsaire White Paper: Application Denial of Service (DoS) Attacks", Apr. 1, 2004, pp. 2-11.

Li, Y., Chen, J., "A Denial-of-Service Resistant Authentication Solution for Security Protocols," iita, pp. 103-106, Workshop on Intelligent Information Technology Application (IITA 2007), 2007, http://www.computer.org/portal/web/csdl/doi/10.1109/IITA.2007.90, accessed Nov. 15, 2010.

OWASP Foundation, "Application Denial of Service", Apr. 22, 2010, http://www.owasp.org/index.php/Application_Denial_of_Service, accessed Nov. 15, 2010.

Wikimedia Foundation, Inc., "Bloom filter", Oct. 22, 2010, https://secure.wikimedia.org/wikipedia/en/wiki/Bloom_filter, accessed Nov. 15, 2010.

Son, J., Luo, H., Seo, S., "Denial of service attack-resistant flooding authentication in wireless sensor networks", Computer Communications, vol. 33 Issue 13, Aug. 2010, http://portal.acm.org/citation.cfm?id=1833995, accessed Nov. 15, 2010.

Reid, R., "SQL Denial of Service Attacks", Oct. 7, 2008, http://blog.strictly-software.com/2008/10/sql-denial-of-service-attacks.html, accessed Dec. 1, 2010.

Liu, X., Yang, X., Lu, Y., "To Filter or to Authorize: Network-Layer DoS Defense Against Multimillion-node Botnets", SIGCOMM Proceedings 2008 (SIGCOMM'08), Aug. 17-22, 2008, pp. 1-12.

Wood, A. D., Stankovic, J. A., "Denial of Service in Sensor Networks", Oct. 2002, IEEE Computer Society, vol. 35 Issue:10, pp. 54-62.

* cited by examiner

MITIGATION OF APPLICATION-LEVEL DISTRIBUTED DENIAL-OF-SERVICE ATTACKS

BACKGROUND

1. Technical Field

The present application relates generally to mitigation of distributed denial-of-service attacks.

2. Description of the Related Art

Denial-of-service (DOS) attacks are a growing concern for website and web service providers. In a DOS attack, one or more attackers attempt to render a network resource effectively unavailable to legitimate users, typically by "flooding" the resource with communications requests. The flood of requests may exploit bugs or insecurities in the targeted computer resource, or else may simply overwhelm the targeted computer resource through the sheer volume of requests. For example, a DOS attack may be designed to consume the target network resource's available network bandwidth, server memory, processor time, hard drive or database space, request queues, database connections, or other resources. A DOS attack may not result in actual failure of the targeted network resource; however, the target may consequently fail to provide access to legitimate clients and requestors because it lacks the resources to service legitimate requests.

Some DOS attacks originate from a single attacking device that repeatedly issues requests to the targeted resource, optionally exploiting bugs or insecure features at the target. Other, distributed, attacks (termed distributed DOS attacks) originate from a number of attacking devices that may participate with or without their respective user's consent. Attacks are frequently implemented at the application level of the TCP/IP stack, since the targeted computer resource's services are typically exposed at this level. For example, a DOS attack may use HTTP request messages and/or web service application programming interfaces (APIs) as entry points.

BRIEF DESCRIPTION OF THE DRAWINGS

In drawings which illustrate by way of example only embodiments of the present application.

DETAILED DESCRIPTION

Figure 1:
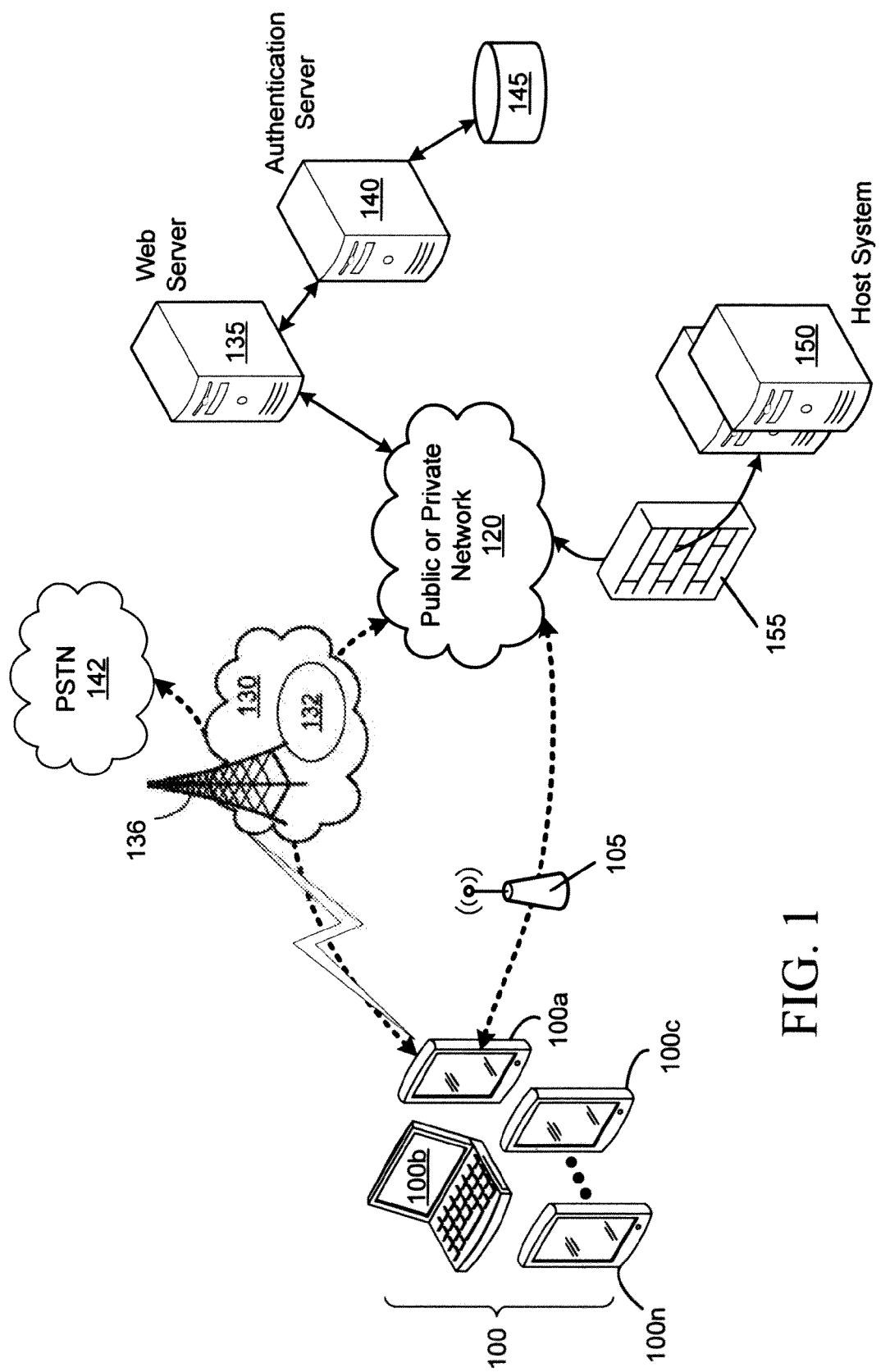
FIG. 1 is a schematic diagram illustrating a network topology for use in communicating information between a mobile communication devices and an authentication server.

The embodiments described herein provide a computing or communication device, service and method arranged to mitigate denial-of-service (DOS) attacks. In the description below, a DOS attack is considered to include a distributed (DDOS) attack unless explicitly stated to the contrary.

There is thus provided a method, comprising: receiving, at an authenticating device, a pre-authentication request comprising at least a reference for a first group shared secret, the first group shared secret being shared among a plurality of devices comprising a first device with which said pre-authentication request is associated; verifying, at the authenticating device, the received pre-authentication request using said first group shared secret; receiving an authentication request; and if the authentication request is determined to have been received from said first device with which the verified pre-authentication request is associated, authenticating the first device in response to the authentication request.

In one aspect of the foregoing, if the authentication request is determined not to have been received from any device with which any verified pre-authentication request is associated, the authentication request is discarded.

In another aspect, the method further comprises determining that the authentication request is received from said first device with which the verified pre-authentication request is associated by determining that said authentication request and said pre-authentication request were received from a single IP address.

In still another aspect, the pre-authentication request and the authentication request are comprised in a single message.

In a further aspect, determining that the authentication request is received from said first device with which the verified pre-authentication request is associated comprises determining that said authentication request comprises a token, the token previously being provided to said first device in response to said verifying.

In yet a further aspect, determining that the authentication request is received from said first device with which the verified pre-authentication request is associated comprises determining that said authentication request and said pre-authentication request comprise a same identifier.

The embodiments herein also provide the further acts of establishing a secure channel between the authenticating device and the first device in response to said pre-authentication request, the pre-authentication request comprising first device credentials for initiating the secure channel; and determining that the authentication request is received from said first device with which the verified pre-authentication request is associated by determining that said authentication request was received over the secure channel.

In other aspects, the pre-authentication request comprises an index of the first group shared secret and a hash comprising the first group shared secret. In still other aspects, the pre-authentication request comprises a payload and a signature, the payload comprising an index of the first group shared secret, a time interval number and a random number derived from the time interval number, and the signature comprising a hash of the first group shared secret and said payload. In the foregoing method, the authentication request may be received at the authenticating device. The first device may be a mobile device.

In still other aspects, the method may also comprise, prior to said receiving the pre-authentication request: providing said plurality of devices comprising said first device with said first group shared secret, said first group shared secret being selected from a group of shared secrets, said plurality of devices being selected from a set of devices; and providing a second plurality of devices of said set of devices with a second group shared secret selected from said set of group shared secrets, said second plurality of devices comprising said first device, wherein said verifying the received pre-authentication request using said first group shared secret comprises determining that the received pre-authentication request comprises at least a reference for at least one of the shared secrets comprised in said set of group shared secrets.

Still further, the method may also provide receiving, at the authenticating device, a further pre-authentication request comprising at least a reference for the second group shared secret from one of the second plurality of devices; upon determining that the second group shared secret is invalid, indicating to said one of the second plurality of devices that the further pre-authentication request has failed; and receiving a second pre-authentication request from said one of the second plurality of devices, said second pre-authentication request comprising at least a reference for a further group shared secret selected from said set of group shared secrets.

The embodiments herein also provide an authenticating device, comprising: a network communication subsystem; and a processor configured to enable: receiving a pre-authentication request comprising at least a reference for a first group shared secret, the first group shared secret being shared among a plurality of devices comprising a first device with which said pre-authentication request is associated; verifying the received pre-authentication request using said first group shared secret; receiving an authentication request; and if the authentication request is determined to have been received from said first device with which the verified pre-authentication request is associated, authenticating the first device in response to the authentication request.

In one aspect, the processor is further configured to enable, if the authentication request is determined not to have been received from any device with which any verified pre-authentication request is associated, discarding the authentication request.

In another aspect, the processor is further configured to enable determining that the authentication request is received from said first device with which the verified pre-authentication request is associated by determining that said authentication request and said pre-authentication request were received from a single IP address.

In still another aspect, the pre-authentication request and the authentication request are comprised in a single message.

In a further aspect, the processor is further configured to enable determining that the authentication request is received from said first device with which the verified pre-authentication request is associated by determining that said authentication request comprises a token, the token previously being provided to said first device in response to said verifying.

In yet another aspect, the processor is further configured to enable determining that the authentication request is received from said first device with which the verified pre-authentication request is associated by determining that said authentication request and said pre-authentication request comprise a same identifier.

In still a further aspect, the processor is further configured to enable: establishing a secure channel between the authenticating device and the first device in response to said pre-authentication request, the pre-authentication request comprising first device credentials for initiating the secure channel; and determining that the authentication request is received from said first device with which the verified pre-authentication request is associated by determining that said authentication request was received over the secure channel.

Further, the pre-authentication request may comprise an index of the first group shared secret and a hash comprising the first group shared secret. In another embodiment, the pre-authentication request comprises a payload and a signature, the payload comprising an index of the first group shared secret, a time interval number and a random number derived from the time interval number, and the signature comprising a hash of the first group shared secret and said payload.

In another aspect, the processor is further configured to enable: providing said plurality of devices comprising said first device with said first group shared secret, said first group shared secret being selected from a group of shared secrets, said plurality of devices being selected from a set of devices; and providing a second plurality of devices of said set of devices with a second group shared secret selected from said set of group shared secrets, said second plurality of devices comprising said first device, wherein said verifying the received pre-authentication request using said first group shared secret comprises determining that the received pre-authentication request comprises at least a reference for at least one of the shared secrets comprised in said set of group shared secrets. Further, the processor may be further configured to enable: receiving a further pre-authentication request comprising at least a reference for the second group shared secret from one of the second plurality of devices; upon determining that the second group shared secret is invalid, indicating to said one of the second plurality of devices that the further pre-authentication request has failed; and receiving a second pre-authentication request from said one of the second plurality of devices, said second pre-authentication request comprising at least a reference for a further group shared secret selected from said set of group shared secrets.

The embodiments herein also provide a computer program product comprising a computer readable medium, which may be non-transitory, bearing program code which, when executed by a processor, causes a computing device to carry out the methods recited herein.

These embodiments will be described and illustrated primarily in relation to an authenticating device, which may comprise one or more servers, databases, computing devices, communication devices, or other computing equipment adapted to communicate over a network (either fixed or wireless) with requesting devices. Requesting devices may comprise servers, personal computers, or other data processing or communication devices, such as wireless communication devices, communicating over fixed and wireless networks and public networks. It will be appreciated by those skilled in the art, however, that this description is not intended to limit the scope of the described embodiments to implementation on these particular systems or devices. For example, the methods and systems described herein may be applied to any appropriate communication device or data processing device adapted to communicate with another communication or data processing device over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on computing devices adapted for communication or messaging, including without limitation cellular phones, smartphones, wireless organizers, personal digital assistants, desktop computers, terminals, laptops, tablets, handheld wireless communication devices, notebook computers, entertainment devices such as MP3 or video players, and the like. Unless expressly stated, a requesting, computing or communication device may include any such device, and an authenticating device or server may include similar types of devices, configured to provide some or all of the authentication processes described herein. The configuration and operation of all such devices generally will be known to those skilled in the art. As another example, the methods and systems described herein are described generally in the context of a client-server system. However, it will be appreciated that this type of architecture is not strictly necessary.

In the primary examples described herein, communication takes place over a public network (such as the Internet or a similar network), adapted to implement the Internet Protocol Suite (TCP/IP) as defined in RFC 1122 as published by the Internet Engineering Task Force, and optionally its predecessor, successor, and accompanying or complementary standards. Reference to a TCP/IP-based communication system is made due to its prevalence; again, however, the person skilled in the art will appreciate that the embodiments described herein may be applied in environments and on networks implementing different communication protocols. For example, other protocols such as the user datagram protocol (UDP), which may also be provided over IP, can be implemented as well.

An exemplary network in which the within embodiments may be implemented is illustrated in FIG. 1. A number of requesting devices 100 (illustrated in FIG. 1 as devices 100a, 100b, 100c . . . 100n) are potential clients or requestors for services or resources from a computing resource over a public or private network 120 (which may be the Internet). As noted above, the requesting devices 100 may comprise wireless communication devices, although the devices may certainly access the network 120 over a fixed connection. In the example of FIG. 1, however, wireless devices are illustrated and paths for both data and voice traffic (if the requesting devices 100 are provisioned for voice communication) are shown.

A requesting device 100's access to IP networks and to a public switched telephone network (PSTN) 142, if applicable, can be provided through the wireless network 130, which comprises one or more nodes 132 configured for communication in accordance with a suitable mobile telephony standard. In turn, the wireless network 130 provides the requesting device 100 with connectivity to the Internet or other public wide area network 120, and thence to one or more services and systems. Alternatively, the requesting device 100 may access the network 120 without using the wireless network 130. Instead, the requesting device 100 may gain access to the network 120 via an access point or at a public or private Wi-Fi hotspot, represented by the access point 105.

The services or resources accessible over the network 120 can include a host system 150. Access to the host system 150 can be provided through one or more routers (not shown), and computing devices of the host system 150 can operate from behind a firewall or proxy server 155. A proxy server provides a secure node and a wireless internet gateway for the host system 150. The proxy server intelligently routes data to the correct destination server within the host system 150. The host system 150 can provide services such as a messaging server, other personal information stores, a mobile data server, an HTTP server, and access to fileservers and application servers within the host system. The host system 150 can also provide the requesting device 100 with access to other servers and services beyond or behind the host system 150, i.e., not necessary forming part of the host system 150 itself.

For some wireless networks 200 or other networks, the requesting device 100 may be registered or activated with the respective network. A process for identifying a subscriber to a cellular network using a SIM or other identifier card is described below. Other methods of registering or identifying the requesting device 100 to various networks will be known to those of ordinary skill in the art. However, registration or activation may not be required for all wireless networks 200, LANs or WLANs, as some networks may allow access without prior registration or activation. The requesting device 100 may also be provisioned or configured to access one or more networks. Methods of provisioning services on a requesting device 100 will be generally known to those skilled in the art, but as a non-limiting example, a request for registration may be sent from the requesting device 100 to a registration server of a service (not shown). If the request is approved, the registration server may transmit to the requesting device 100 a service book or similar data item containing data and instructions to enable the requesting device 100 to provision the service. The service book, when received at the requesting device 100, may be self-executing, and permits the user to enter account information relevant to the associated service. This information is then transmitted from the requesting device 100 to a provisioning server of the service provider (not shown), which then creates a service account associated with the requesting device 100. Provisioning may also be carried out in compliance with the OMA DM (Open Mobile Alliance Device Management) specification version 1.2 or its predecessor or successor versions, published by the Open Mobile Alliance Ltd.

Additionally or alternatively, one or more online services represented by web server 135 are accessible over the network 120 by the requesting devices 100, by user devices connected to the host system 150 LAN, or by other user devices, not shown in FIG. 1. The online service may implement one or more types of web services, such as a web server, messaging service, social network service, push service, online commerce or banking service, content service (e.g., music service, publisher, newsreader or content aggregating services), discussion forums, and the like. An online service may also include a communications network or access thereto. These services may be accessible using a browser client application on the requesting device 100, or using other applications, applets, widgets and the like which may operate in a browser environment or in a different runtime environment; these applications and other modules used to access the online services are configured to issue requests and to receive responses over the network 120. The client application may be a dedicated application for a corresponding online service, such as an entertainment or productivity application (music player or document editing application) designed to communicate with a corresponding entertainment service or document service (such as a music library or store, or a cloud-based software as a service provider or file server).

As with the host system 150, access to these other online services represented by the web server 135 may require subscription or registration. In addition, once the subscription or registration is established, further access to the data or services provided by these services may be restricted only to authenticated users who have presented adequate security credentials to permit the online service to verify their identity or legitimacy. A common method of authenticating requestors for services is to verify that the requestor has proof of knowledge of a secret shared by both an authenticator (which may be comprised in the online service itself, or provided as a third party service operating on behalf of the online service) and the requestor. This secret is held only by the authenticator and the particular requestor; in that way, the authenticator can use the requestor's proof of knowledge of the shared secret to verify the requestor's identity. In a simple embodiment, the requestor may transmit a password (either in the clear or in an obfuscated or encrypted form) to the authenticator, which then looks up the authenticator's copy of the password and verifies whether the received password matches the authenticator's stored copy. The password is thus the shared secret. In the example of FIG. 1, the web server 135 is in communication with an authentication server 145. Passwords or other user credentials can be stored in a database 145 accessible by the authentication server. If the password matches, then the requestor is authenticated, since it is presumed that the secret is shared only between the online service (or authenticator) and the requestor. Upon authentication, the authenticator grants access to the online service's services or data. Optionally, the authentication server (or a communication server associated with the authenticator) can transmit a message to the requesting device 100 to notify the requesting device 100 that it has been authenticated.

Other methods for authenticating requestors will be known to those skilled in the art. For example, proof of knowledge of the shared secret may comprise some other value that is independently derivable by each of the requestor and authenticator using secret information shared exclusively by the two parties. When the requestor seeks to be authenticated, the requestor derives this value and generates a message comprising this derived value, and transmits this message to the authenticator. The authenticator, in turn, generates the same value from its version of the shared secret and compares the result to the received message in order to authenticate the requestor.

Regardless of the precise means by which authentication is accomplished, typically the authenticator's copy of the shared secret, certificate, or other data used to authenticate the requestor is stored in one or more databases, such as the database 145, or similar data storage structure, particularly when there may be a large number (on the order of thousands or millions) of potential requestors. Thus, each time a request is received for authentication, the authenticator must query the database for the appropriate data to validate the authentication request. Regardless of how efficiently the proof of knowledge is transmitted or computed, the database query is inherently slow. This presents a vulnerability that can be exploited through a DOS attack in which multiple requesting devices initiate requests for authentication. An illegitimate request for authentication—that is to say, a request generated by an attacker that is not intended to result in authentication—received over the network 120 may be indistinguishable from a legitimate request generated by a user that is intended to result in authentication. In some scenarios, the originating address of the request may be spoofed by the attacker to appear to come from a legitimate requester, or at least not from a known illegitimate source. Thus, the online service or authenticator may not be able to detect the onset of a DOS attack. Servicing each individual request for authentication will necessitate a database query. Attackers may leverage the similar appearances of legitimate and illegitimate requests and the overhead involved in querying the database to orchestrate a DOS attack. Since attackers may steal resources from other computers on the network in order to conduct the DOS attack (for example by deploying a botnet, using malicious software to infect and take over the operation of other networked computers which are then used to initiate the requests) the consumption of network resources to mount a DOS attack is often not a concern to the attacker.

A number of countermeasures for DOS attacks exist. One preventive technique is to overprovision the online service and/or authenticator to increase its capacity to handle spikes in requests. This technique results in a waste of resources, since they are not needed most of the time during normal operation. Another is to limit the number of concurrent connections or bandwidth available to individual client devices, which may throttle accesses by legitimate requestors during peak periods. Another option is to maintain a blacklist of IP addresses that are considered "suspect" or associated with illegitimate activity such as spamming and DOS attacks, or a whitelist of IP addresses associated with legitimate requestors. However, the blacklist and whitelist must be maintained and updated on a regular basis, and furthermore, the IP address associated with a legitimate requestor may change, resulting in false positives (or negatives) when a requesting IP address is filtered against the blacklist or whitelist. Finally, firewalls and routers, while they may be configured to reject certain types of requests that may be employed in DOS attacks, may be ineffective when the attacker's request resembles a legitimate request.

Other countermeasures for DOS attacks shift the burden of mitigating attacks on the client device itself, by requiring "proof of work" from the client. When a client device seeks to be authenticated, the authenticator transmits a puzzle (for example, a cryptographic problem) to the client device to be solved. The client device must dedicate resources to the solution, then transmit a response with the solution back to the authenticator for verification before the authenticator engages in any resource-intensive authentication steps. The puzzle consumes resources at the client device; thus, if the device was in fact an attacker, its ability to flood the authenticator with authentication requests is attenuated. However, this effect is reduced when the attacker is a high-powered workstation or when the attacker is not concerned with the waste of resources by the attacking computers, and it adversely affects legitimate requesting devices, which may be low-powered devices with constrained computing resources. It is therefore desirable to provide a countermeasure to DOS attacks that reduces the incidence of requests from illegitimate clients for "expensive" processes (such as database queries) that need not be dependent on the other types of countermeasures mentioned above, and that is less likely to prevent legitimate clients from accessing the service.

Thus, in accordance with a first embodiment, a group password or shared secret is provided to each legitimate requesting device. The same group shared secret is held by every requesting device, and is stored in memory at the online service, rather than in a database. Referring to FIG. 1, each of the requesting devices 100 is provided with the group shared secret. When one of the requesting devices wishes to authenticate at the online service, the requesting device 100 transmits a first authentication request (a "pre-authentication" request) comprising the group shared secret, or proof of knowledge of the group shared secret, to the authenticating device. In the example of FIG. 1, the requesting device 100 first opens a connection with the authenticating device, then transmits the pre-authentication request. This pre-authentication request may be transmitted to the web server 135, which is the client device-facing module in the online service. In one variant of this embodiment, the authenticator copy of the group shared secret is stored in memory at the web server 135. The web server 135 may thus be considered to be the first authenticating device in this embodiment.

The web server 135 retrieves the group shared secret from its memory and compares it to the group shared secret received in the pre-authentication request or to the proof of knowledge provided in the pre-authentication request. For example, the requesting device 100 may compute a hash of the group shared secret and transmit the hash only to the web server 135. The hash may be accompanied by (or concatenated or otherwise combined with) a nonce or similar value to mitigate the possibility of a replay attack, if the requesting device 100's transmission is intercepted by a third party. The web server 135 then retrieves its copy of the group shared secret from memory and computes its own hash. If the hash matches the received hash, then the pre-authentication request is successful and the requesting device is verified as a legitimate device. At this stage, the requesting device 100 has not yet been completely authenticated; the requesting device 100 has only been identified as belonging to a set of requesting devices 100 that is believed to be legitimate, but the password or other authentication data associated with the account or other service to be accessed at the online service has not yet been provided to the authenticator. However, this initial pre-authentication step verifies that the requesting device 100 is, at least, likely to be a legitimate requestor. Since the group shared secret is stored in memory, it is very quick to access, particularly when compared to the time and resources required to query a database.

In a second variant of this embodiment, the group shared secret is not stored in the web server 135's memory, but rather is stored in memory at the authentication server 140. Thus, when the pre-authentication request is retrieved, the authenticator copy of the group shared secret is retrieved from the authentication server 140's memory and compared to the group shared secret or proof of knowledge received in the pre-authentication request, as described above. Thus, in this embodiment, the authenticating device may comprise the web server 135, the authentication server 140, or both.

In the foregoing embodiment, if the pre-authentication request is successful, a response is sent by the authentication device to the requesting device 100 to confirm that the pre-authentication was indeed successful. This response may include a token or other value for use by the requesting device 100 when requesting complete authentication. The requesting device 100 constructs a new message as a second request (the "authentication request"), this one including the token or other value received from the authenticating device as well of proof of knowledge of a secret shared exclusively between the authenticating device and the requesting device 100, such as the aforementioned password or a value derived by the requesting device 100 from secret information. This proof of knowledge may, again, be signed or encrypted. Upon receipt of the authentication request, the authenticating device determines that the request was received from a legitimate requesting device 100. In this example, this can be done by determining that the correct token or value from the confirmation message sent to the requesting device 100 was received in the authentication request. If the correct token or value was received, then the request is deemed to have been received from a legitimate source, and the authenticating device 100 then queries the database (such as the database 145) for the shared secret needed to verify the shared secret portion of the authentication request. If the correct token or value was not received, then the authenticating device closes the connection between it and the requesting device 100, and does not query the database 145 for the shared secret. Since presumably only legitimate requesting devices 100 possess the group shared secret, this process will reduce the number of database queries initiated as a result of an illegitimate authentication request.

However, if the group shared secret in the above embodiment is disclosed by even one device of the set of legitimate requesting devices, the authenticating device again is exposed to an increased risk of a DOS attack. Accordingly, an enhancement to this scheme is illustrated in FIG. 2.

Figure 2:
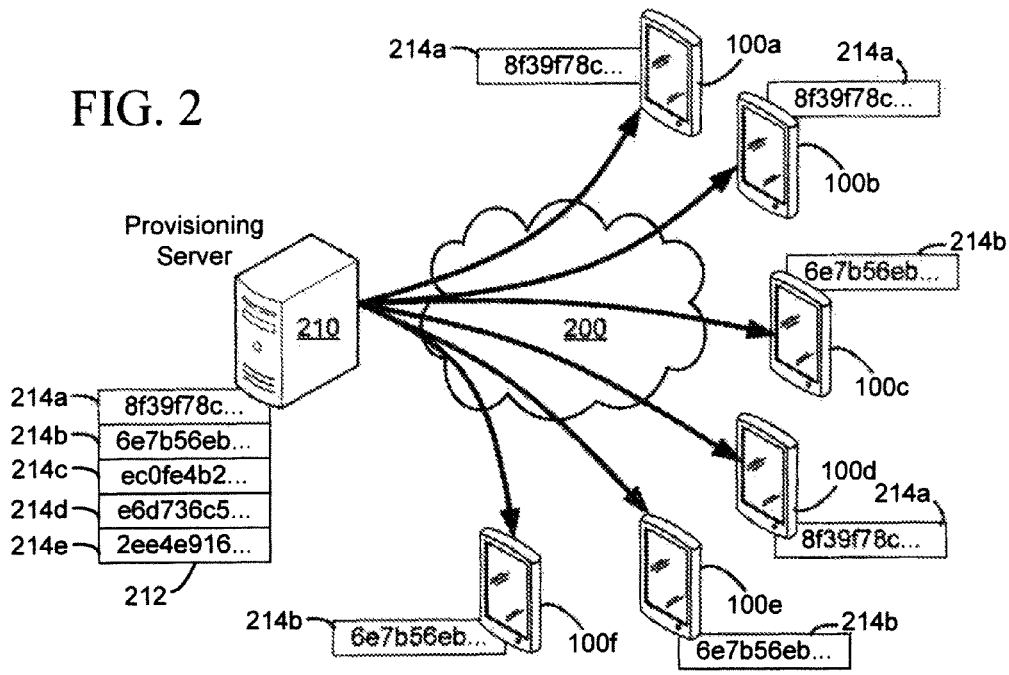
FIG. 2 is a schematic diagram illustrating a distribution of group shared secrets among a set of requesting devices.

FIG. 2 shows a provisioning server 210 in communication over a network 200 with a plurality of requesting devices 100a, 100b, 100c, 100d, 100e, and 100f. Only six requesting devices are shown for ease of reference; it is contemplated that the pool of requesting devices 100 will be significantly larger. The provisioning server 210 may be the same server as the web server 135 or authenticating server 140 of FIG. 1 (i.e., it may be included in the authenticating device described above). The provisioning server 210 provisions the request devices 100 with data, permissions, and other settings for accessing a service such as the online services described above. This provisioning service may be integrated with, or separate from, the online service.

The provisioning service 210 stores a number of possible group shared secrets 212. In FIG. 2, only five group shared secrets 214a, 214b, 214c, 214d and 214e are illustrated for ease of reference. There may be N group shared secrets, where N may take any value such as 1000. Typically, N will be less than the number of requesting devices 100 that may communicate with the online service, authenticating device, web server 135 or authenticating server 140 or combination thereof.

The group shared secrets 212 comprise a set of distinct values, such as quasi-random values generated using any suitable generation algorithm or hashes of predetermined values or strings. Advantageously, each group shared secret within the set 212 is of a sufficient length that it cannot be easily spoofed or guessed by an attacker. In one embodiment, each group shared secret is 256 bits in length. Even though an attacker may attempt to guess at a 256-bit group shared secret value in a brute force attack (in which the attacker issues a series of pre-authentication requests using different values until one is discovered to match a stored group shared secret), by the time the attacker has cycled through enough requests to hit upon an actual group shared secret value, the authenticating device 100 may be able to determine that the requests originating from the attacker's IP address are illegitimate, and block further requests from that address.

Each requesting device 100 in the pool of requesting devices is provided with one of the group shared secrets from the set 212. These group shared secrets may be embedded in each requesting device 100 at the time of manufacture, or provisioned at a later date. Since there are likely more requesting devices 100 than group shared secrets, some devices 100 will share the same group shared secret. Thus, in FIG. 2, requesting devices 100a, 100b, and 100d each store a copy of the first group shared secret 214a. Requesting devices 100c, 100e and 100f each store a copy of the second group shared secret 214b. Some of the group shared secrets in the set 212 may not be allocated to any device 100 at all, or else they may be allocated to devices that are not illustrated in the figures. The authenticating device, for example the web server 130 or the authenticating server 140, also maintains the set of group shared secrets 212. While the provisioning server 210 or the authenticating device may maintain a record of which group shared secret was allocated to which requesting device 100, this is not mandatory.

If one of the group shared secrets, for example 214a, is subsequently found to be compromised, the authenticating device and the provisioning server 210 can delete that group shared secret from the set 212, or else mark the group shared secret as being invalid. This will have the effect of invalidating the group shared secret held by requesting devices 100*a*, 100*b* and 100*d*, which will prevent them from successfully completing pre-authentication. However, the remaining devices 100*c*, 100*e* and 100*f*, and any other requesting device 100 that does not have the group shared secret 214*a*, may still successfully pre-authenticate with the group shared secret that they do possess. For example, if there are N=1000 group shared secrets defined in the set 212 and they are substantially equally allocated among all requesting devices 100 in the pool of legitimate requesting devices, then if an attacker compromises only one of those group shared secrets and that group shared secret is invalidated, 99.9% of the pool of legitimate requesting devices will still be able to pre-authenticate with the authenticating device, since their group shared secret will not be invalidated. If the group shared secrets held by one hundred of the requesting devices in the pool of requesting devices were compromised through exposure to an attacker, then at most one hundred group shared secrets may be compromised, or 10% of the entire set of N=1000 group shared secrets. Given that any group shared secret therefore has a 10% chance of being compromised, 90% of the legitimate requesting devices 100 would still be able to pre-authenticate.

Figure 3:
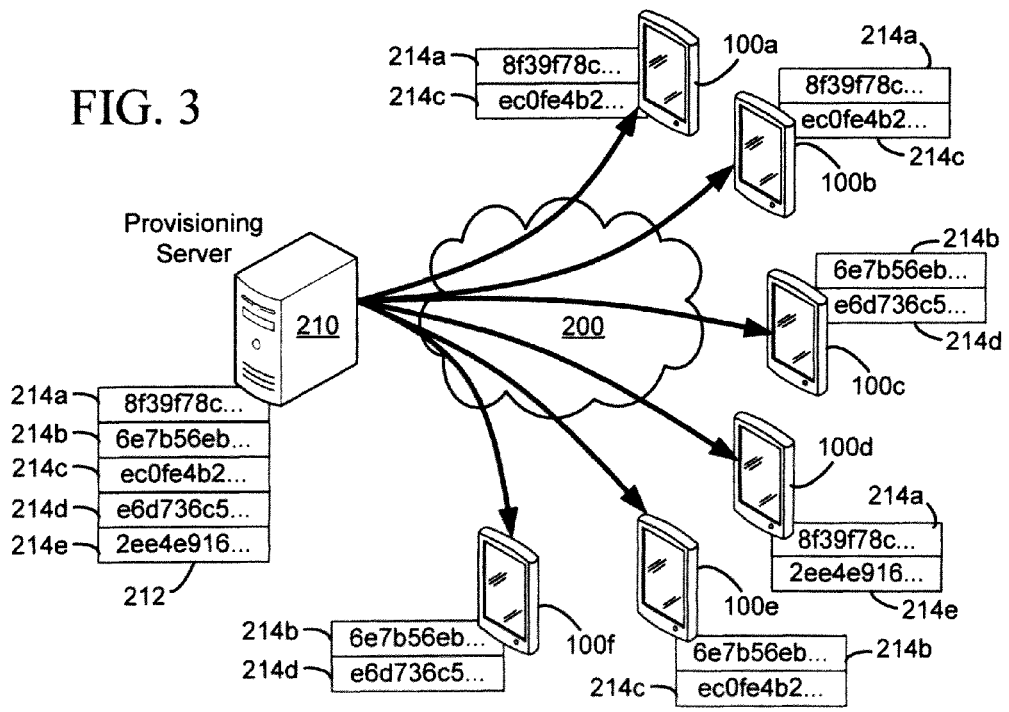
FIG. 3 is a schematic diagram illustrating a further distribution of group shared secrets among a set of requesting devices.

A further enhancement is illustrated in FIG. 3, in which each device 100 has been provided with two group shared secrets instead of only one. The allocation of group shared secrets from the set 212 to each device 100 may be carried out in a random or quasi-random fashion. In FIG. 3, it can be seen that the first and second requesting devices 100*a*, 100*b* each store group shared secrets 214*a*, 214*c*, whereas the third and sixth devices 100*c*, 100*f* each store group shared secrets 214*b*, 214*d*, while the fourth device 100*d* stores group shared secrets 214*a*, 214*e* and the fifth stores group shared secrets 214*b*, 214*c*. Thus, in this example there are four groupings of requesting devices 100. If any one of these devices is compromised and its group shared secrets discovered by an attacker, then upon determination that the device and its group shared secret have been compromised, those two group shared secrets will be marked as invalid or deleted from the set 212. However, despite the invalidation of two group shared secrets, no more than two devices in this example will be rendered unable to accomplish a successful pre-authentication, because no more than two devices (such as 100*a* and 100*b* or 100*c* and 100*f*) possess the same pair of group shared secrets. Accordingly, if one device, such as 100*a*, is compromised, all of devices 100*c*, 100*d*, 100*e* and 100*f* will still be able to pre-authenticate because they will have at least one valid group shared secret that can be used to attempt pre-authentication. The process for pre-authentication is described in further detail below.

Referring back to the example in which N=1000 and one hundred of the requesting devices 100 are compromised, in the example of FIG. 3 it can be seen that up to 200 or 20% of the group shared secrets would be compromised (assuming that each of the one hundred compromised devices 100 was in possession of a unique pair of group shared secrets). Accordingly, given that up to 20% of the group shared secrets may be compromised, approximately 96% or possibly more of the legitimate requesting devices 100 will still be able to pre-authenticate, since each device is in possession of two group shared secrets.

Figure 4:
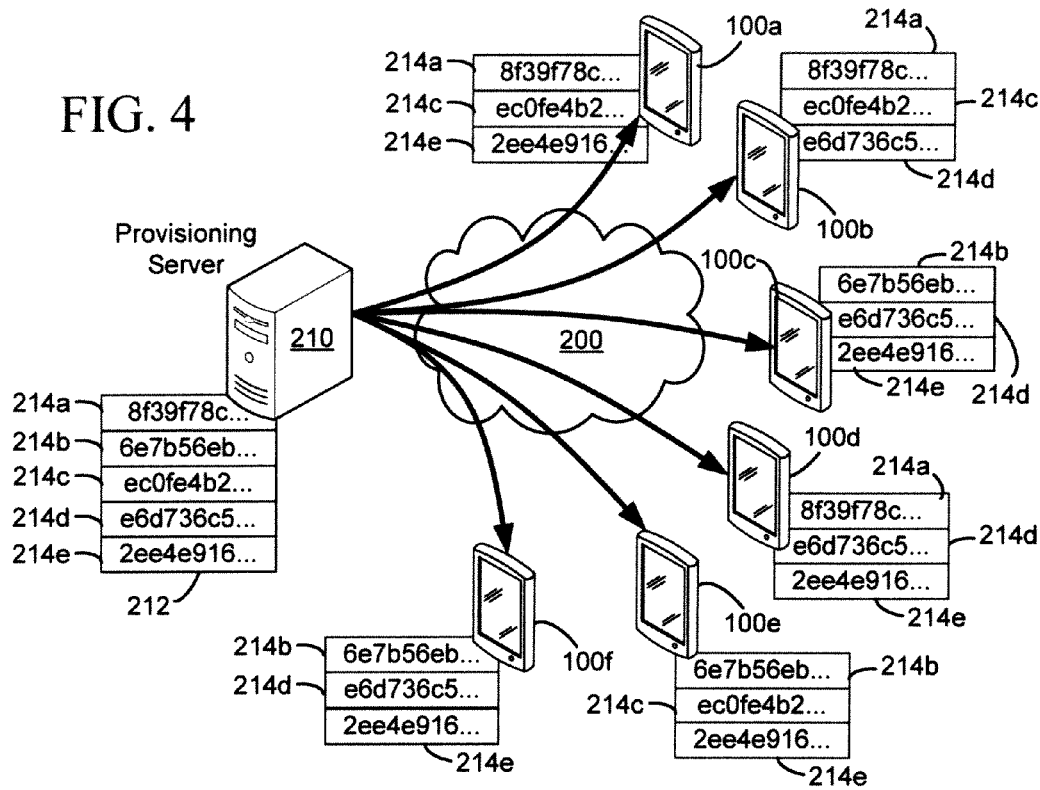
FIG. 4 is a schematic diagram illustrating another distribution of group shared secrets among a set of requesting devices.

FIG. 4 illustrates a still further example in which each device 100 holds three group shared secrets. In this example, only two devices hold the same subset of group shared secrets from the set 212: the first device 100*a* holds group shared secrets 214*a*, 214*c*, and 214*e*; device 100*b* holds 214*a*, 214*c* and 214*d*; device 100*c* holds 214*b*, 214*d* and 214*e*; device 100*d* holds 214*a*, 214*d*, and 214*e*; devices 100*e* and 100*f* hold 214*b*, 214*c*, and 214*e*. Thus, if the first device 100*a* and its stored group shared secrets are compromised and marked invalid, each of the remaining devices 100*b*, 100*c*, 100*d*, 100*e* and 100*f* may still be able to pre-authenticate since at least one of their group shared secrets will not have been invalidated. If one of the devices 100*c*, 100*f* is compromised and its group shared secrets marked invalid, then the other device (100*f* or 100*c*) will be unable to pre-authenticate as well.

Again, referring back to the example in which N=1000 and one hundred of the requesting devices 100 are compromised, in the example of FIG. 4 it can be seen that up to 300 or 30% of the group shared secrets could be compromised (again assuming that each of the one hundred compromised devices 100 was in possession of a unique pair of group shared secrets). Consequently, approximately 97.6%, or possibly more, of the legitimate requesting devices 100 would likely have at least one uncompromised group shared secret and would therefore still be able to pre-authenticate.

The total number of group shared secrets in the set 212 may be selected to be any appropriate number by a person of ordinary skill in the art. It will be appreciated, however, that even where each group shared secret is 256 bits in length, up to one million distinct group shared secrets could be stored in a small amount of memory (approximately 32 MB). Thus, in practice where there is a large number of legitimate requesting devices 100—on the order of hundreds of millions of devices 100—a significant number of legitimate requesting devices 100 would likely be able to pre-authenticate with one of their group shared secrets even if a percentage of the devices were compromised and their group shared secrets invalidated. As N and the number of group shared secrets increases further, the percentage of legitimate requesting devices 100 that will be prevented from pre-authenticating will drop off to an insignificant figure.

Figure 5:
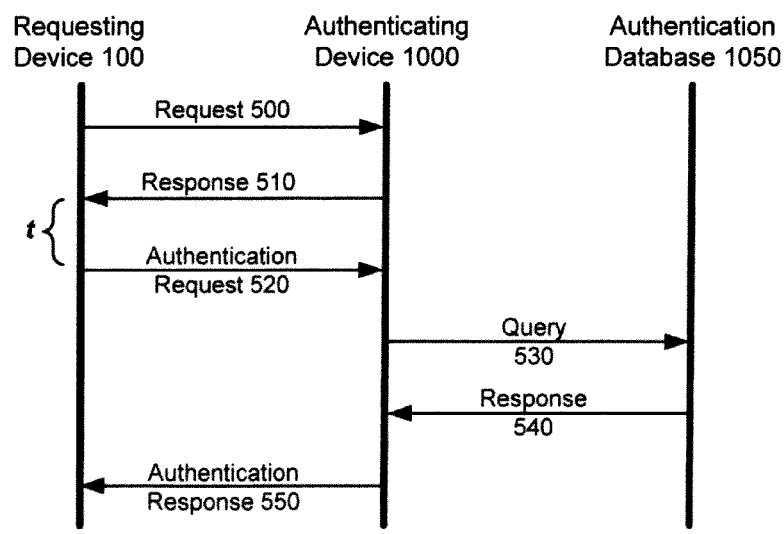
FIG. 5 is a schematic diagram illustrating communication flow between a requesting device, and authenticating device, and an authentication database.

The implementation of the above group shared secret system will now be described with reference to an authentication process such as might be carried out by a requesting device 100, an authenticating device 1000, and an authentication database 1050. Turning to FIG. 5, a simple communication flow diagram is illustrated. The requesting device 100 initiates the authentication process by transmitting a request 500 to the authenticating device 1000. It will be appreciated that if this communication is taking place over a TCP/IP network such as the Internet, the transmission of the request 500 may be preceded by a standard TCP three-way handshake process in order to place the authentication device 1000, which may be a server, in a "listen" state so that it is receptive to the request 500 (recall that, as noted above, communications need not take place using the TCP/IP protocol, but may employ any other suitable communications protocol or method). At that stage, additional DOS countermeasures may be implemented, which are not described in detail here but will be known to those skilled in the art. For example, the TCP handshake procedure may be implemented with TCP SYN cookies to reduce the likelihood of a DOS attack due to a SYN flood.

The request 500 transmitted by the requesting device 100 includes a pre-authentication message payload that includes, at a minimum, some proof of knowledge of a group shared secret. This group shared secret is selected from a subset group shared secrets stored at the requesting device 100; the size of the subset of group shared secrets is described above. The proof of knowledge may consist of the group shared secret itself, but advantageously the group shared secret is obfuscated so that observers cannot learn the group shared secret by intercepting the request 500, so the request 500 comprises at a minimum an indicator or reference to the group shared secret. For example, the group shared secret may be hashed, and provided in the payload together with an index value identifying the group shared secret in the authentication device 1000's group shared secret store. The hash may incorporate not only the group shared secret, but also a salt, nonce, timestamp, or other value that may be used to mitigate potential replay attacks due to interception by a third party.

The authenticating device 1000 may, as described above, comprise a server or other network computing resource, and may be comprised within one of various network resources in communication with the requesting device 100, such as the web server 135, authentication server 140, or in other embodiments implemented within or in combination with the host system 150 and firewall 155. The authenticating device 1000 may further comprise programming code embodied in a program medium, such as a non-transitory computer-readable medium, executable to carry out the functions described herein. This programming code may be obfuscated to deter detection or reverse engineering. The authenticating device 1000 receives the request 500 and extracts information from the request to verify the requesting device 100's claimed proof of knowledge of the selected group shared secret. If the group shared secret is simply sent in the clear, the authenticating device 1000 may simply look up the received group shared secret in its own set of group shared secrets stored in memory. If the group shared secret is provided in hashed form with an index value, the authenticating device 1000 can use the received index value to look up the corresponding group shared secret in memory, and then compute the hash of this group shared secret value to determine if it matches the hashed value received from the requesting device 100. If there is a match, then the requesting device 100 is pre-authenticated and the authenticating device 1000 may send a response 510 confirming pre-authentication to the requesting device 100.

It will be appreciated by those skilled in the art that this group shared secret lookup can be performed much faster and with less burden on computing resources than a full authentication requiring a database query or a computationally "expensive" or intensive cryptographic process. If a hash is used, the hash may be computed relatively quickly, and does not impose a significant additional burden on the authenticating device 1000's resources. Thus, this pre-authentication request-response process provides a fast check on whether the requesting device 100 is likely a legitimate client seeking authentication.

Subsequent to the successful pre-authentication, the requesting device 100 sends an authentication request 520 to the authenticating device 1000. The authentication request includes authentication information, such as proof of knowledge of a shared secret that is shared exclusively between the requesting device 100 and the authenticating device 1000, as well as other optional information, discussed below. To minimize the likelihood of a replay attack, the authentication request 520 should be transmitted within a determined time interval t, which is discussed in further detail below. When the authentication device 1000 receives the request 520, it determines whether the request 520 was received from a requesting device 100 that was determined to be likely legitimate; and if so, the authenticating device 1000 queries 530 the authentication database 1050 for the authentication information needed to verify the requesting device 100's claimed proof of knowledge of the exclusive shared secret. The response from the database is received at 540, and the authentication is completed by the authenticating device 1000. A response 550 based on the outcome of authentication is then transmitted to the requesting device 100.

Optionally, before the authentication request 520 is transmitted, the authenticating device 1000, having determined that the requesting device 100 is likely legitimate, may upgrade the connection between it and the requesting device 100 to a more secure connection, for example implementing TLS or another form of encrypted communication.

In the foregoing embodiments and in FIG. 1, an authentication server 140 and a separate authenticating device 1000 have been described for verifying the pre-authentication and authentication requests. However, in other embodiments the component or module carrying out pre-authentication may be separate from the component or module carrying out authentication, as may be the component or module of the authenticating device 1000 computing hashes or the component or module storing all group shared secrets. Each of these components may be hosted on a separate component or provided in a separate code or hardware module. In other words, the device carrying out the pre-authentication described above—as described above, the authenticating device 1000—need not be the same network resource that will process and authenticate the authentication request 520, although in this embodiment the authenticating device 1000 carries out all of these functions. The authentication system as a whole can comprise a system of independent but cooperating components: a pre-authentication module or process, and an authentication module or process. The pre-authentication module and process thus effectively operate to grant the requesting device 100 with permission to seek full authentication by the authentication module or process. The pre-authentication module or process thus communicates with the authentication module or process as necessary to provide the authentication module or process with any needed information to confirm that a subsequently received request for full authentication is considered legitimate, although in some embodiments the subsequent request may be sufficient in itself to provide the needed confirmation. The authenticating device 1000 described herein may provide only the pre-authentication function. For ease of reference herein, however, the pre-authentication and authentication functions are all generally described as being carried out by the authenticating device 1000.

In a further embodiment, group shared secrets need not be explicitly stored at the authenticating device 1000. In a further embodiment, a hash function and a global secret known only to the authenticating device 1000 is provided. Each requesting device 100 is provisioned with an identifier n and a hash of the global secret and identifier, $K_n=(s|n)$. The requesting device is not provided with the hash function or the global secret itself. When pre-authentication is sought, the requesting device 100 may then send only $(n, K_n)$ to the authenticating device 1000, which in turn may compute the hash to pre-authenticate the requesting device 100. The pre-authentication computation thus avoids the need to explicitly store group shared secrets, and may be implemented in a hardware module either with the authenticating device 1000 itself or in operative communication therewith.

Figure 6:
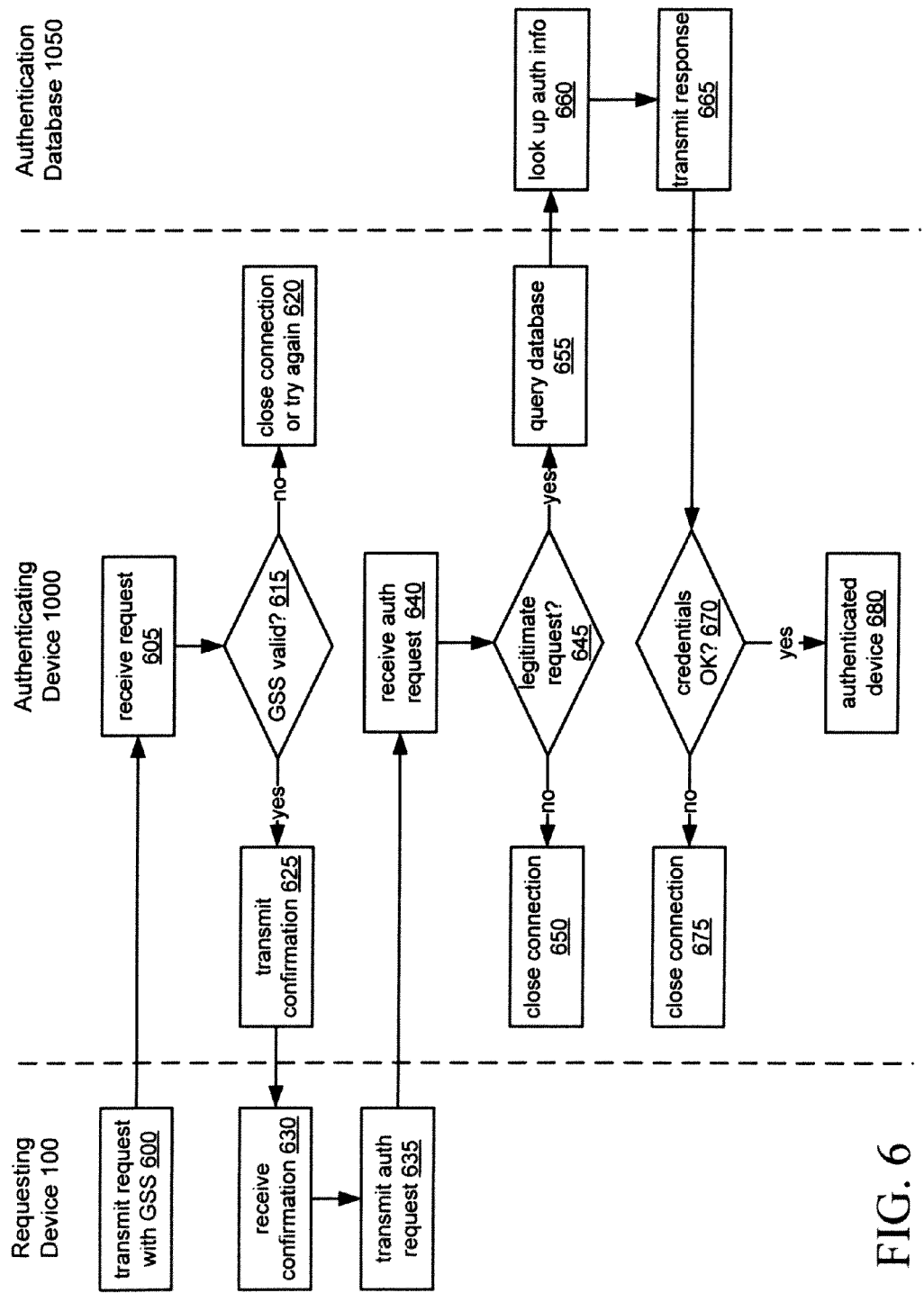
FIG. 6 is a flowchart illustrating a process of authentication of a requesting device.

The process of authentication is set out in further detail in FIG. 6. Once a connection is open between the authenticating device 1000 and the requesting device 100, the requesting device 100 transmits a pre-authentication request comprising a selected group shared secret, or proof of knowledge of the selected group shared secret, to the authenticating device 1000 at 600. At 605, the authenticating device 1000 receives the request. At 615, the authenticating device 1000 determines whether the received group shared secret is valid. This determination includes looking up a group shared secret value, in the authenticating device 1000's memory, and can also include determining the status of that group shared secret; for example, the group shared secret may be marked "invalid" as a result of an earlier determination that it had been compromised. A determination that a group shared secret is "invalid" is advantageously stored on a permanent or quasi-permanent basis.

If the authenticating device 1000 determines that the received group shared secret is invalid, the authenticating device 1000 may either, at 620, close the connection with the requesting device 100 or transmit a response to the requesting device 100 to try again with a different group shared secret, if the requesting device 100 stores more than one group shared secret. If the received group shared secret is valid, then at 625 a confirmation message is transmitted to the requesting device 100. This confirmation is received at 630, and then at some point later, the requesting device 100 transmits an authentication request 635, which is received by the authenticating device 1000 at 640. At 645 it is determined whether the received authentication request is a legitimate request. An example of this process is described below with reference to FIGS. 7 and 8. If the request is determined to be illegitimate, then at 650 the connection is closed. The authenticating device 1000 may further maintain a record of illegitimate requests received from a given requesting device 100 (i.e., from a given IP address, since if communications are taking place over TCP/IP it is likely that the authenticating device 1000 can be reasonably certain of the requesting device 100's IP address). If a large number of illegitimate requests are received from a given IP address, that address may be blacklisted or otherwise blocked by the authenticating device 1000.

If the request is determined at 645 to be legitimate, at 655 the authenticating device 1000 constructs a query for the authentication database 1050. The authentication database 1050 receives this query and looks up the necessary authentication information at 660, then transmits a response back to the authenticating device 1000 at 665. In an alternate embodiment, no database lookup may be necessary; instead, a cryptographic computation may be performed using the contents of the query to determine if the authenticating device 100 should be authenticated. If, based on the response received, the authenticating device 1000 determines that the credentials received in the requesting device 100's authentication request are valid at 670, then it is determined that at 680 the device is an authenticated device 100. The device 100 may then be granted access to the online services or data for which it was authenticated. If it is determined at 670 that the credentials are not valid, then the connection is closed at 675. Again, the authenticating device 1000 may maintain a record of failed authentication requests associated with a given IP address, and/or associated with the group shared secret transmitted in the request 600. If a large number of failed authentication requests are received from this device, or in association with this particular group shared secret, then it may be determined that either the device 100 has been compromised, and/or the group shared secret has been compromised. Steps may be taken accordingly to blacklist the device 100, and to invalidate or delete the group shared secret at the authenticating device 1000.

It will be appreciated by those skilled in the art that the authentication query received from the requesting device 100 is identified by the authenticating device 1000 as likely being received from a requesting device that was in fact successfully pre-authenticated using a process such as those described above. The nexus between the successful pre-authentication request and the subsequent authentication query may be provided by one or more of a number of different means. One example is the token included in the second request sent by the requesting device 100 described above. The nexus is thus the provision of this token by the authenticating device 1000 to the requesting device 100 in response to the pre-authentication request. Another example of a nexus is the receipt of the authentication request from the same IP (or other network) address as the pre-authentication request, since the IP address of a single user device is unlikely to change within the period of time spanning the receipt of the pre-authentication and authentication requests. Still another example is the inclusion of a single identifier (other than a network address) in both the pre-authentication and authentication request. As still a further example, the pre-authentication request may comprise an initial asymmetric encryption handshake message for initiating a secure, encrypted connection between the requesting device 100 and the authenticating device 1000; the subsequent authentication request would then be received over the secure channel thus established, once the pre-authentication is successful. The fact of the receipt of the authentication request over this secure channel thus provides the nexus with the successful pre-authentication request.

In still a further embodiment, the nexus may comprise the concurrent transmission of both the pre-authentication and the authentication request: rather than transmit these requests consecutively, they may be transmitted together in the same message. The authenticating device 1000 receives this combined pre-authentication and authentication request, and processes the pre-authentication request first generally as described above. If the pre-authentication process is successful, then the authenticating device 1000 proceeds to the authentication process with the further credentials provided by the requesting device 100 in the authentication portion of the message. This combined process avoids delay inherent in providing confirmation to the requesting device 100 and awaiting the further query. In a variant of this combined request, the payload of the authentication request (the shared secret, for example) is comprised in the pre-authorization request hash.

Figure 7:
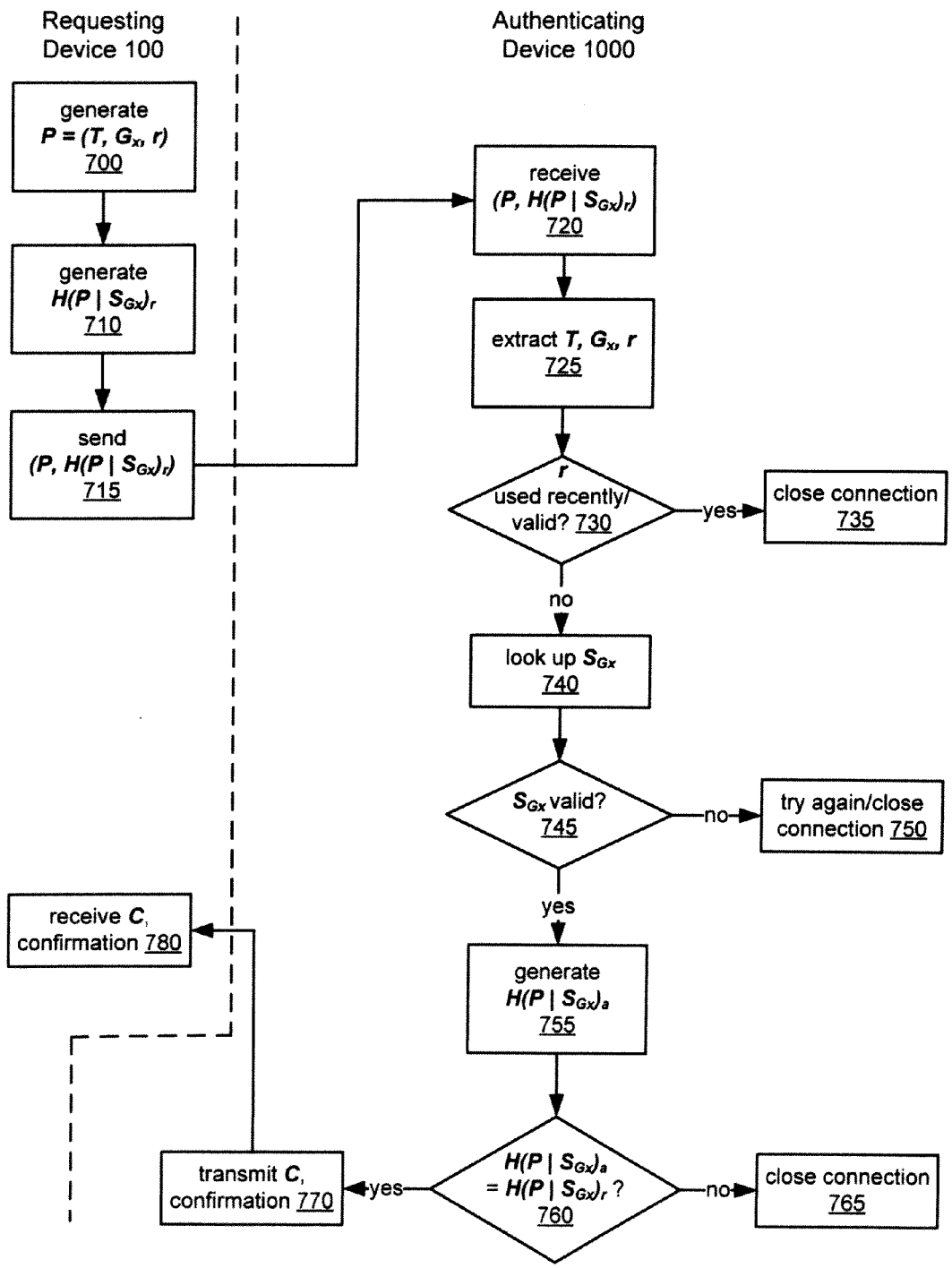
FIG. 7 is a flowchart illustrating a process of pre-authenticating a requesting device.

One particular implementation of group shared secrets in the pre-authentication stage is illustrated in FIG. 7. At 700, once a connection has been opened between the requesting device 100 and the authentication device 1000, the requesting device 100 generates a message with a payload comprising at least the group shared secret or a group shared secret reference or indicator. The message may also include countermeasures against various attacks. In the example of FIG. 7, additional information is included as a countermeasure to a replay attack. Thus, in this example payload $P=(T, G_x, r)$, where T is a time interval number (for example, a number identifying a number of hours or other number of units of time from an arbitrarily selected epoch), $G_x$ is an index number corresponding to a selected group shared secret stored at the requesting device 100, and r is a random or quasi-random number. The value r is used to mitigate replay attacks, as explained below. r can be changed with each time interval T. In some embodiments, the derivation or generation of r takes place at the time the message payload is generated; in other words, the value of r need not be known in advance to either the requesting device 100 or authenticating device 1000 before the first request message containing that value of r is sent. The value of r may be derived from T using a predetermined method known by the requesting device 100 and optionally the authenticating device 1000. The time interval number T and optionally the random number r is also independently derivable or otherwise known to the authenticating device 1000; however, the requirement that the authenticating device 1000 be capable of independently determining r is not mandatory.

Next, at 710, a signature $H(P|S_{Gx})_r$ is computed from a hash of a concatenation of P and $S_{Gx}$, where $S_{Gx}$ is the group shared secret corresponding to the index number $G_x$. A message is then sent at 715 comprising both the payload P and the signature $H(P|S_{Gx})_r$. Thus, the requesting device sends the authenticating device 1000 proof of knowledge of a group shared secret, without disclosing the group shared secret in the clear to any observers.

The message is received at 720 by the authenticating device 1000. The authenticating device 1000 then extracts T, $G_x$, r from the payload at 725, and first determines whether r has been used recently at 730. If it has, then the request may be a suspected replay attack, and the connection is closed at 735. The authenticating device may store values of r from previously received messages or compute r for corresponding time interval number values T, for a given range of T values. Since the T value determined at the requesting device 100 should generally correspond to the value known at the authenticating device 1000 (with some allowance for error), the authenticating device 1000 need only store or compute values of r corresponding to the current value of T as well as the most recent values of T, as well as near future T values. If a received request contains an r determined by the authenticating device 1000 to have been used in a previous request, particularly where that value of r corresponds to the current T or a nearby range of T, then the request may be suspected to be one of a number of reply attacks, and the request may be ignored. However, some tolerance may be provided by the authenticating device 1000 for repeat requests apparently originating from the same source requesting device 100, since the repeated request may be the result of the requesting device 100 failing to receive acknowledgement of an earlier request transmission. However, if the received r is determined to have been used several times within the corresponding time interval T or nearby T, then the request may be strongly suspected to be one of a number of replay attacks and ignored. If the received r does not match a stored value of r in that case, then the request is invalid.

Otherwise, if r is valid, the authenticating device 1000 looks up a group shared secret in its set of group shared secrets at 740 using the index value $G_x$, and determines whether the group shared secret corresponding to $G_x$ exists and is valid. If it is not (for example, if the value falls outside the range of stored group shared secret index values), then at 750 the authenticating device 1000 may close the connection with the requesting device 100, or else may notify the requesting device 100 to try again with a different group shared secret. If the located group shared secret is valid, then at 755, the authenticating device 1000 computes its own signature, $H(P|S_{Gx})_a$, using its located group shared secret value and the provided payload P at 755. If it is determined that $H(P|S_{Gx})_a = H(P|S_{Gx})_r$ at 760 then a confirmation message, optionally comprising confirmation value C, is transmitted at 770 to the requesting device 100. C may be a value generated at the authenticating device 1000 that the requesting device 100 must return in its authentication request.

Figure 8:
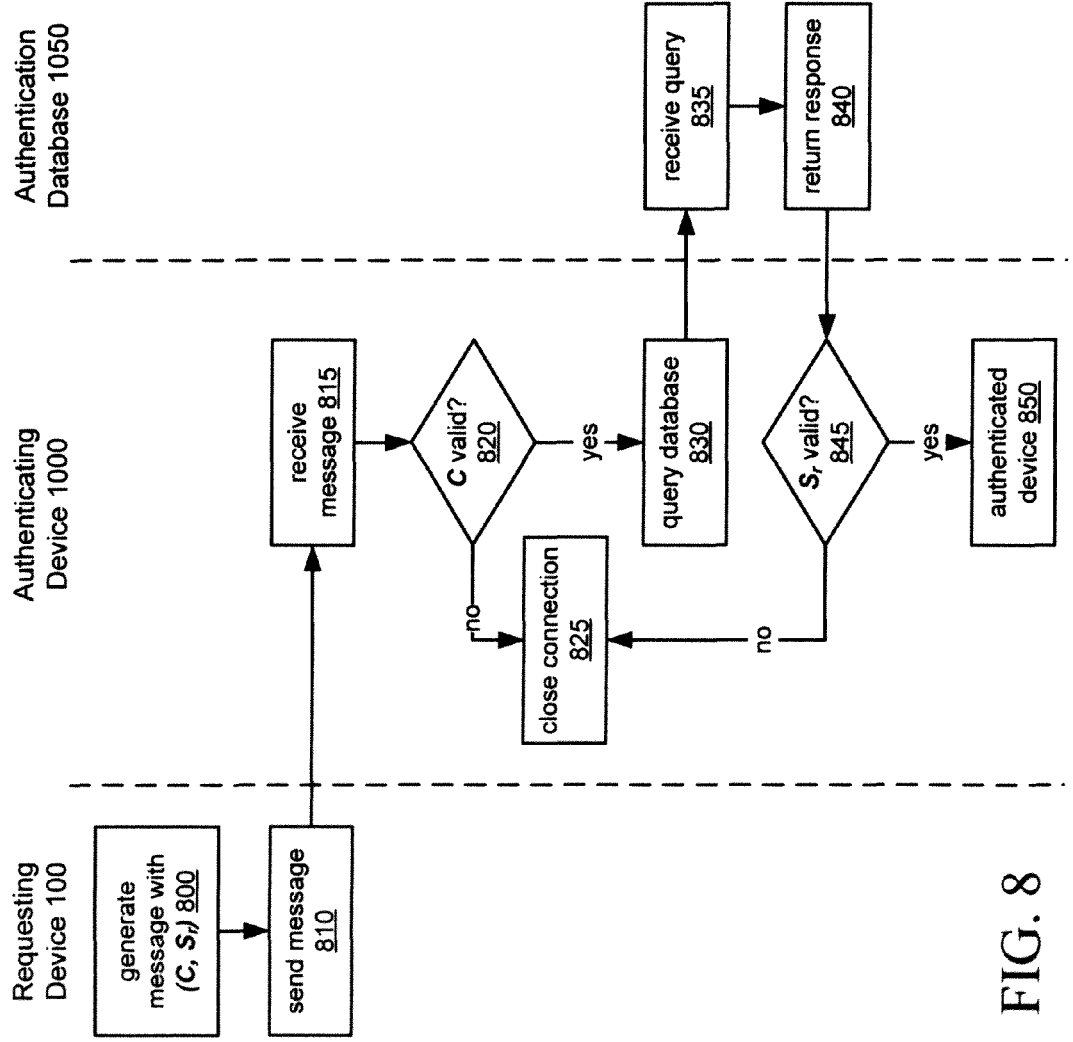
FIG. 8 is a flowchart illustrating a process of authenticating the requesting device after the process of FIG. 7.

At a subsequent time, which is expected to occur shortly after the pre-authentication of the requesting device 100, the requesting device 100 transmits an authentication request, as indicated in FIG. 8 at 800. The authentication request comprises proof of knowledge of a shared secret $S_r$ that is known only to the authenticating device 1000 and the requesting device 100. As described above, this may be a password or other secret value, and the authentication request may be constructed using known methods for generating authentication request message payloads, obfuscating or encrypting shared secret information, and so forth. The authentication request may include the confirmation value C, if it was provided. The authentication request is received at 815, and if the optional value C was included, it is extracted at 820 and it is determined at 820 whether it is valid. If it is not, the connection with the requesting device 100 is closed at 825. Alternatively the authenticating device 1000 determines whether the request was received from a requesting device 100 that was previously and recently pre-authenticated. If the authentication request is received during the same session as the pre-authentication request, then the authenticating device 1000 may determine that the authentication request received at 815 was received from a legitimate requesting device 100.

Upon determining that the authentication request is legitimate, the authenticating device 1000 queries the authentication database 1050 for the authentication information necessary to verify the received information in the authentication request. The query may comprise a requesting device 100 identifier included in the authentication request. The authentication database receives the query at 835, and returns a response at 840. The response from the database 1050 is used by the authenticating device 1000 to determine whether the proof of knowledge received in the authentication request is valid at 845, for example, whether the shared secret used to generate the information received in the authentication request matches the shared secret stored in the authentication database 1050 for that identified requesting device 100. If the shared secret used to generate the authentication request is not valid, then again the connection is closed at 825. If the shared secret is valid, then at 850 the device 100 is authenticated.

Figure 9:
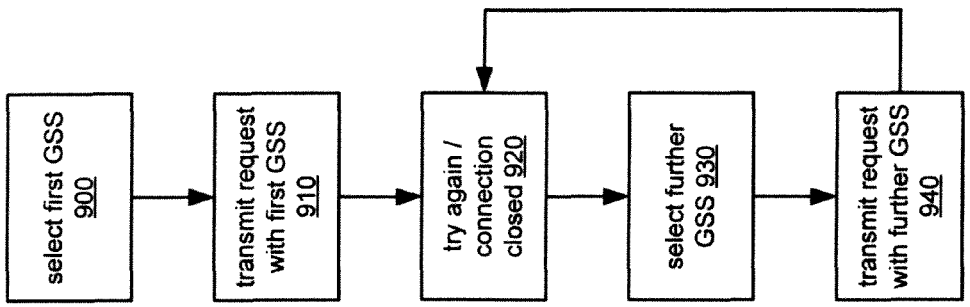
FIG. 9 is a flowchart illustrating a process for requesting pre-authentication.

As noted above, if one of the group shared secrets is rendered invalid because it is compromised, during the pre-authentication stage illustrated in FIG. 6 or 7 the authenticating device 1000 may notify the requesting device 100 that the pre-authentication request has failed and that the device 100 should retry with a different group shared secret. Alternatively, the device 100 may determine that a new attempt should be made with a different group shared secret even if no notification is received from the authenticating device 1000, simply because the connection was closed without a confirmation message. FIG. 9 illustrates a process that may be implemented by the requesting device 100 during the pre-authentication stage. At 900 the requesting device 100 selects a first group shared secret stored at the device, and at 910 the pre-authentication request is transmitted using the first group shared secret. If, in response to the pre-authentication request the requesting device 100 receives a notification to try again, or if the connection with the authenticating device 1000 is closed at 920, then at 930 the requesting device 100 selects a further group shared secret that it has stored, and transmits a further pre-authentication request with the further selected group shared secret at 940. This process from 920 through 940 may be repeated until a confirmation message is received and the requesting device 100 is able to transmit the authentication request, or until the requesting device 100 has tried each of the group shared secrets stored thereat.

Figure 10:
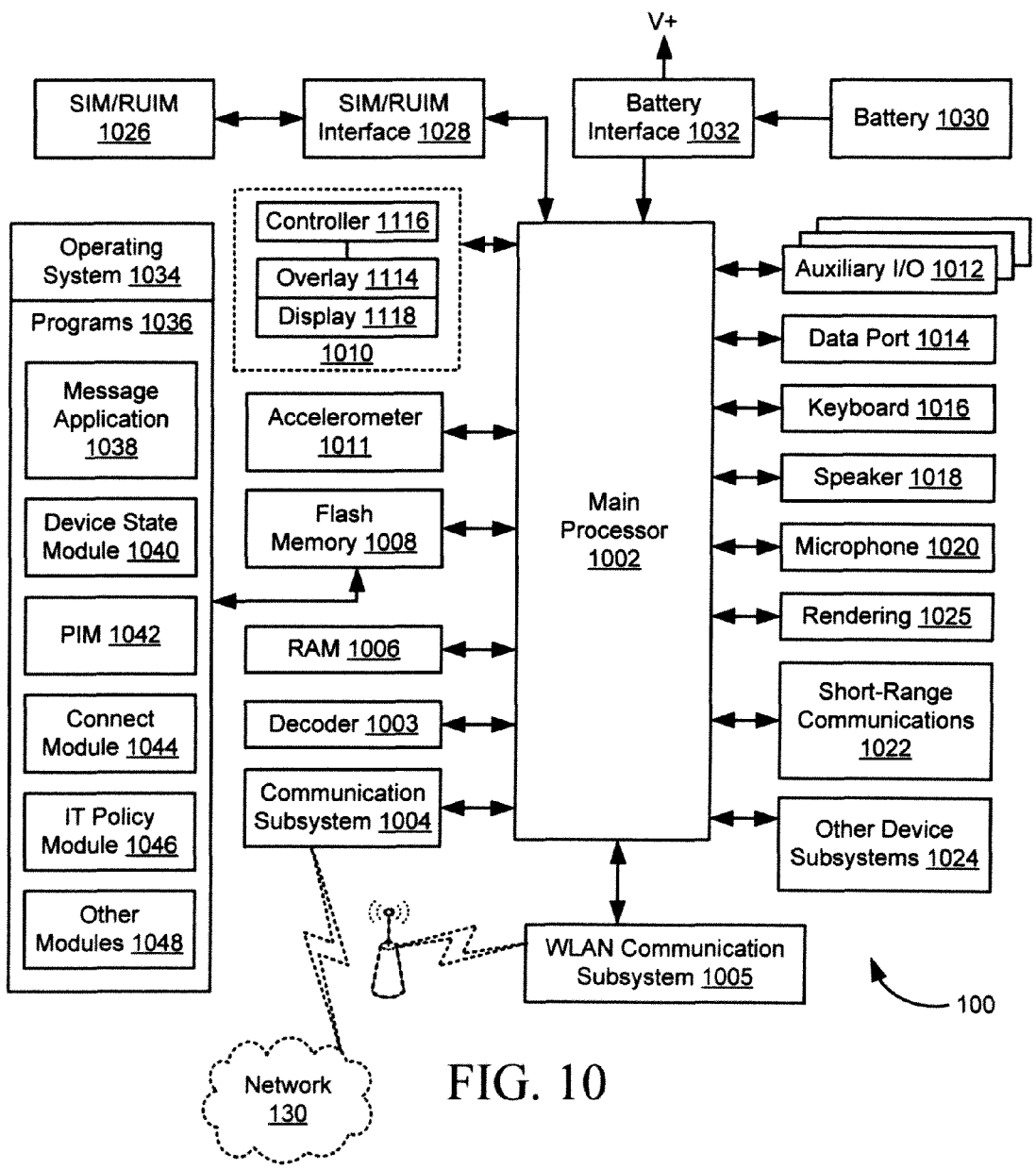
FIG. 10 is a block diagram of an embodiment of a mobile device for use with the embodiments of FIGS. 1 to 9.

The embodiments described herein for implementation on a computing device may be implemented on a communication device such as that illustrated in FIG. 10. The communication device may communicate with other devices over a wireless communication system. The communication device 100 may be a mobile device with two-way communication and advanced data communication capabilities including the capability to communicate with other mobile devices or computer systems through a network of transceiver stations. The communication device 100 can also have voice communication capabilities. However, it will be appreciated by those skilled in the art that the foregoing embodiments do not require a dual-mode communication device; it is sufficient for the device 100 to be provisioned for data communication only via a fixed or wireless connection. Wireless connectivity may be provided by means of on-board communication hardware, such as the communication subsystems 1004, 1005 described below, or using accessories such as a wireless dongle or mobile hotspot device, not shown.

FIG. 10 is a block diagram of an exemplary embodiment of a communication device 100. The communication device 100 includes a number of components such as a main processor 1002 that controls the overall operation of the communication device 100. Communication functions, including data and voice communications, are performed through a communication subsystem 1004. Data received by the communication device 100 can be decompressed and decrypted by decoder 1003, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 1004 receives messages from and sends messages to a wireless network 130 (FIG. 1). In this exemplary embodiment of the communication device 100, the communication subsystem 1004 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 1004 with the wireless network 130 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 1005 also shown in FIG. 10. The WLAN communication subsystem may operate in accordance with a known network protocol such as one or more of the 802.11™ family of standards developed by IEEE. The communication subsystem 1005 may be separate from, or integrated with, the communication subsystem 1004 or with the short-range communications module 1022. The main processor 1002 also interacts with additional subsystems such as a Random Access Memory (RAM) 1006, a flash memory 1008, a display interface 1010, other data and memory access interfaces such as an auxiliary input/output (I/O) subsystem 1012 or a data port 1014, a keyboard 1016, a speaker 1018, a microphone 1020, the short-range communications subsystems 1022 and other device subsystems 1024. The communication device may also be provided with an accelerometer 1011, which may be used to detect gravity- or motion-induced forces and their direction. Detection of such forces applied to the device 100 may be processed to determine a response of the device 100, such as an orientation of a graphical user interface displayed on the display interface 1010 in response to a determination of the current orientation of the device 100.

In some embodiments, the user device 100 may comprise a touchscreen-based device, in which the display interface 1010 is a touchscreen interface that provides both a display for communicating information and presenting graphical user interfaces, as well as an input subsystem for detecting user input that may be converted to instructions for execution by the device 100. The touchscreen display interface 1010 may be the principal user interface provided on the device 100, although in some embodiments, additional buttons, variously shown in the figures, or a trackpad, or other input means may be provided. In one embodiment, a transmissive TFT LCD screen 1118 is overlaid with a clear touch sensor assembly 1114 that supports single and multi-touch actions such as tap, double-tap, tap and hold, tap and drag, scroll, press, flick, and pinch. The touchscreen display interface 1010 detects these single and multi-touch actions, for example through the generation of a signal or signals in response to a touch, which may then be processed by the processor 1002 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 1010 may be provided with separate horizontal and vertical sensors or detectors to assist in identifying the location of a touch. A signal is provided to the controller 1116, shown in FIG. 10, in response to detection of a touch. The controller 1116 and/or the processor 1002 may detect a touch by any suitable contact member on the touch-sensitive display 1010.

Some of the subsystems of the communication device 100 perform communication-related functions, whereas other subsystems can provide "resident" or on-device functions. By way of example, the display interface 1010 and the keyboard 1016 can be used for both communication-related functions, such as entering a text message for transmission over the network 130 (FIG. 1), and device-resident functions such as a calculator or task list.

A rendering circuit 1025 is included in the device 100. When a user specifies that a data file is to be viewed on the display interface 1010, the rendering circuit 1025 analyzes and processes the data file for visualization on the display interface 1010. Rendering data files originally optimized or prepared for visualization on large-screen displays on a portable electronic device display often requires additional processing prior to visualization on the small-screen portable electronic device displays. This additional processing may be accomplished by the rendering engine 1025. As will be appreciated by those of skill in the art, the rendering engine can be implemented in hardware, software, or a combination thereof, and can comprise a dedicated image processor and associated circuitry, or can be implemented within main processor 1002.

The communication device 100 can send and receive communication signals over the wireless network 130 after required network registration or activation procedures have been completed. Network access is associated with a subscriber or user of the communication device 100. To identify a subscriber, the communication device 100 requires a SIM/RUIM/UICC card 1026 (i.e. Subscriber Identity Module, Removable User Identity Module, Universal Integrated Circuit Card, or the like) or another suitable identity module to be inserted into a SIM/RUIM/UICC interface 1028 in order to communicate with a network. The SIM/RUIM/UICC card 1026 is one type of a conventional "smart card" that can be used to identify a subscriber of the communication device 100 and to personalize the communication device 100, among other things. Without the SIM/RUIM/UICC card 1026, the communication device 100 is not fully operational for communication with the wireless network 130. By inserting the SIM/RUIM/UICC card 1026 into the SIM/RUIM/UICC interface 1028, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 1026 includes a processor and memory for storing information. Once the SIM/RUIM/UICC card 1026 is inserted into the SIM/RUIM/UICC interface 1028, it is coupled to the main processor 1002. In order to identify the subscriber, the SIM/RUIM/UICC card 1026 can include some user parameters such as an International Mobile Subscriber Identity (IMSI). An advantage of using the SIM/RUIM/UICC card 1026 is that a subscriber is not necessarily bound by any single physical mobile device. The SIM/RUIM/UICC card 1026 can store additional subscriber information for a mobile device as well, including datebook (or calendar) information and recent call information. Alternatively, user identification information can also be programmed into the flash memory 1008.

The communication device 100 may be a battery-powered device including a battery interface 1032 for receiving one or more rechargeable batteries 1030. In at least some embodiments, the battery 1030 can be a smart battery with an embedded microprocessor. The battery interface 1032 is coupled to a regulator (not shown), which assists the battery 1030 in providing power V+ to the communication device 100. Although current technology makes use of a battery, future technologies such as micro fuel cells can provide the power to the communication device 100.

The communication device 100 also includes an operating system 1034 and software components 1036 to 1046 which are described in more detail below. The operating system 1034 and the software components 1036 to 1046 that are executed by the main processor 1002 are typically stored in a persistent store such as the flash memory 1008, which can alternatively be a read-only memory (ROM) or similar storage element (not shown). Those skilled in the art will appreciate that portions of the operating system 1034 and the software components 1036 to 1046, such as specific device applications, or parts thereof, can be temporarily loaded into a volatile store such as the RAM 1006. Select other modules 1048 may also be included, such as those described herein. Other software components can also be included, as is well known to those skilled in the art.

The subset of software applications 1036 that control basic device operations, including data and voice communication applications, will normally be installed on the communication device 100 during its manufacture. Other software applications include a message application 1038 that can be any suitable software program that allows a user of the communication device 100 to send and receive electronic messages. Various alternatives exist for the message application 1038 as is well known to those skilled in the art. Messages that have been sent or received by the user are typically stored in the flash memory 1008 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 1040, a Personal Information Manager (PIM) 1042, and other suitable modules (not shown). The device state module 1040 provides persistence, i.e. the device state module 1040 ensures that important device data is stored in persistent memory, such as the flash memory 1008, so that the data is not lost when the communication device 100 is turned off or loses power.

The PIM 1042 includes functionality for organizing and managing data items of interest to the user, such as, but not limited to, e-mail, contacts, calendar events, voice mails, appointments, and task items. A PIM application has the ability to send and receive data items via the wireless network 130. PIM data items can be seamlessly integrated, synchronized, and updated via the wireless network 130 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system. Some or all of the data items stored at the communication device 100 may be indexed for searching on the device 100 either through a corresponding application, such as the PIM 1042, or another suitable module. In addition, the items may be searchable using a unified search process implemented in the device operating system 1034. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The communication device 100 also includes a connect module 1044, and an information technology (IT) policy module 1046. The connect module 1044 implements the communication protocols that are required for the communication device 100 to communicate with the wireless infrastructure and any host system, such as a host system with which the communication device 100 is authorized to interface.

The connect module 1044 includes a set of Application Programming Interfaces (APIs) that can be integrated with the communication device 100 to allow the communication device 100 to use any number of services associated with the host system or with other systems accessible over the network 130. The connect module 1044 allows the communication device 100 to establish an end-to-end secure, authenticated communication pipe with the host system. A subset of applications for which access is provided by the connect module 1044 can be used to pass IT policy commands from the host system to the communication device 100. This can be done in a wireless or wired manner. These instructions can then be passed to the IT policy module 1046 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 130, the auxiliary I/O subsystem 1012, the data port 1014, the short-range communications subsystem 1022, or any other suitable device subsystem 1024. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 1014 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 1014 can be any suitable port that enables data communication between the communication device 100 and another computing device. The data port 1014 can be a serial or a parallel port. In some instances, the data port 1014 can be a USB port that includes data lines for data transfer and a supply line that can provide a charging current to charge the battery 1030 of the communication device 100.

The short-range communications subsystem 1022 provides for communication between the communication device 100 and different systems or devices, without the use of the wireless network 130. For example, the subsystem 1022 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1004 and input to the main processor 1002. The main processor 1002 will then process the received signal for output to the display 1010 or alternatively to the auxiliary I/O subsystem 1012. A subscriber can also compose data items, such as e-mail messages, for example, using the keyboard 1016 in conjunction with the display interface 1010 and possibly the auxiliary I/O subsystem 1012. The auxiliary I/O subsystem 1012 can include devices such as: a touchscreen, mouse, track ball, infrared fingerprint detector, or a roller wheel with dynamic button pressing capability. The keyboard 1016 may be an alphanumeric keyboard and/or telephone-type keypad. However, other types of keyboards can also be used. A composed item can be transmitted over the wireless network 130 through the communication subsystem 1004. It will be appreciated that if the display interface 1010 comprises a touchscreen, then the auxiliary I/O subsystem 1012 may still comprise one or more of the devices identified above.

For voice communications, the overall operation of the communication device 100 is substantially similar, except that the received signals are output to the speaker 1018, and signals for transmission are generated by the microphone 1020. Alternative voice or audio I/O subsystems, such as a voice message recording subsystem, can also be implemented on the communication device 100. Although voice or audio signal output is accomplished primarily through the speaker 1018, the display interface 1010 can also be used to provide additional information such as the identity of a calling party, duration of a voice call, or other voice call related information.

The communication subsystem 1004 component may include third party applications, which are added after the manufacture of the communication device 100. Examples of third party applications include games, calculators, utilities, etc.

The additional applications can be loaded onto the communication device 100 through at least one of the wireless network 130, the auxiliary I/O subsystem 1012, the data port 1014, the short-range communications subsystem 1022, or any other suitable device subsystem 1024. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 1014 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 1014 can be any suitable port that enables data communication between the communication device 100 and another computing device. The data port 1014 can be a serial or a parallel port. In some instances, the data port 1014 can be a USB port that includes data lines for data transfer and a supply line that can provide a charging current to charge the battery 1030 of the communication device 100.

The short-range communications subsystem 1022 provides for communication between the communication device 100 and different systems or devices, without the use of the wireless network 130. For example, the subsystem 1022 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 1004 and input to the main processor 1002. The main processor 1002 will then process the received signal for output to the display interface 1010 or alternatively to the auxiliary I/O subsystem 1012. A subscriber can also compose data items, such as e-mail messages, for example, using the keyboard 1016 in conjunction with the display interface 1010 and possibly the auxiliary I/O subsystem 1012. The auxiliary I/O subsystem 1012 can include devices such as: a touchscreen, mouse, track ball, infrared fingerprint detector, or a roller wheel with dynamic button pressing capability. The keyboard 1016 may be an alphanumeric keyboard and/or telephone-type keypad. However, other types of keyboards can also be used. A composed item can be transmitted over the wireless network 130 through the communication subsystem 1004. It will be appreciated that if the display interface 1010 comprises a touchscreen, then the auxiliary I/O subsystem 1012 may still comprise one or more of the devices identified above.

For voice communications, the overall operation of the communication device 100 is substantially similar, except that the received signals are output to the speaker 1018, and signals for transmission are generated by the microphone 1020. Alternative voice or audio I/O subsystems, such as a voice message recording subsystem, can also be implemented on the communication device 100. Although voice or audio signal output is accomplished primarily through the speaker 1018, the display interface 1010 can also be used to provide additional information such as the identity of a calling party, duration of a voice call, or other voice call related information.

The communication subsystem component 1004 may include a receiver, transmitter, and associated components such as one or more embedded or internal antenna elements, Local Oscillators (LOs), and a processing module such as a Digital Signal Processor (DSP) in communication with the received and transmitter.

The additional applications can be loaded onto the communication device 100 through at least one of the wireless network 130, the auxiliary I/O subsystem 1012, the data port 1014, the short-range communications subsystem 1022, or any other suitable device subsystem 1024. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 1014 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 1014 can be any suitable port that enables data communication between the communication device 100 and another computing device. The data port 1014 can be a serial or a parallel port. In some instances, the data port 1014 can be a USB port that includes data lines for data transfer and a supply line that can provide a charging current to charge the battery 1030 of the communication device 100.

The short-range communications subsystem 1022 provides for communication between the communication device 100 and different systems or devices, without the use of the wireless network 130. For example, the subsystem 1022 can include an infrared device and associated circuits and components for short-range communication.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method implemented at an authenticating device, the method comprising:
   storing, prior to receiving any authorization requests, a plurality of group shared secrets in memory accessible to the authenticating device, the plurality of group shared secrets comprising at least a first group shared secret and a second group shared secret, the first group shared secret being also stored in memory of each of a first plurality of requesting devices prior to transmission of any authorization request by any of the first plurality of requesting devices to the authenticating device;

the second group shared secret being also stored in memory of each of a second plurality of requesting devices prior to transmission of any authorization request by any of the second plurality of requesting devices to the authenticating device, the first plurality of requesting devices and the second plurality of requesting devices each comprising different subsets of a set of requesting devices while also including at least one common requesting device from the set of requesting devices;

receiving a pre-authentication request comprising at least a reference for the first group shared secret of the plurality of group shared secrets, the pre-authentication request being transmitted from a first requesting device of the first plurality of requesting devices;

verifying, at the authenticating device, the received pre-authentication request using said first group shared secret;

receiving an authentication request comprising proof of knowledge of a secret shared exclusively between the authenticating device and the first requesting device; and when the authentication request is determined to have been transmitted from said first requesting device, authenticating the first requesting device in response to the authentication request.

2. The method of claim 1, further comprising, if the authentication request is determined not to have been transmitted from any requesting device from which any verified pre-authentication request was transmitted, discarding the authentication request.

3. The method of claim 1, further comprising determining that the authentication request was transmitted from said first requesting device by determining that said authentication request and said pre-authentication request were transmitted from a same IP address.

4. The method of claim 1, wherein the pre-authentication request and the authentication request are comprised in a single message.

5. The method of claim 1, further comprising determining that the authentication request was transmitted from said first requesting device by determining that said authentication request comprises a token, the token previously being provided to said first requesting device in response to said verifying and being distinct from the exclusively shared secret.

6. The method of claim 1, further comprising determining that the authentication request was transmitted from said first requesting device by determining that said authentication request and said pre-authentication request comprise a same identifier.

7. The method of claim 1, further comprising:
establishing a secure channel between the authenticating device and the first requesting device in response to said pre-authentication request, the pre-authentication request comprising credentials from the first requesting device for initiating the secure channel; and
determining that the authentication request was transmitted from said first requesting device by determining that said authentication request was transmitted over the secure channel.

8. The method of claim 1, wherein the pre-authentication request comprises an index of the first group shared secret and a hash comprising the first group shared secret.

9. The method of claim 1, wherein the pre-authentication request comprises a payload and a signature, the payload comprising an index of the first group shared secret, a time interval number and a random number derived from the time interval number, and the signature comprising a hash of the first group shared secret and said payload.

10. The method of claim 1, wherein receiving the pre-authentication request or receiving the authentication request comprises receiving the pre-authentication request or the authentication request from a web server in communication with the authenticating device.

11. The method of claim 1, further comprising, prior to said receiving any pre-authentication request:
providing each of the first plurality of requesting devices with said first group shared secret; and
providing each of the second plurality of requesting devices with said second group shared secret.

12. The method of claim 1, further comprising:
receiving, at the authenticating device, a further pre-authentication request comprising at least a reference for the second group shared secret, the further pre-authentication request being transmitted from a further requesting device of the second plurality of requesting devices;
determining that the second group shared secret is invalid;
indicating to said further requesting device that the further pre-authentication request has failed when the second group shared secret is determined to be invalid;
receiving a subsequent pre-authentication request from said further requesting device, said subsequent pre-authentication request comprising at least a reference for a further group shared secret selected from said plurality of group shared secrets;
verifying the subsequent pre-authentication request using said further group shared secret, the further group shared secret being valid;
receiving a further authentication request comprising proof of knowledge of the secret shared exclusively between the authenticating device and the further requesting device; and
when the further authentication request is determined to have been transmitted from the further requesting device, authenticating the further requesting device in response to the authentication request.

13. The method of claim 1, wherein the first requesting device comprises a mobile device.

14. An authenticating device, comprising:
a network communication subsystem; and
at least one processor configured to enable:
storing, prior to receiving any authorization requests, a plurality of group shared secrets in memory accessible to the authenticating device, the plurality of group shared secrets comprising at least a first group shared secret and a second group shared secret,
the first group shared secret being also stored in memory of each of a first plurality of requesting devices prior to transmission of any authorization request by any of the first plurality of requesting devices to the authenticating device;
the second group shared secret being also stored in memory of each of a second plurality of requesting devices prior to transmission of any authorization request by any of the second plurality of requesting devices to the authenticating device, the first plurality of requesting devices and the second plurality of requesting devices each comprising different subsets of a set of requesting devices while also including at least one common requesting device from the set of requesting devices;
receiving a pre-authentication request comprising at least a reference for the first group shared secret of the plurality of group shared secrets, the pre-authentication request being transmitted form a first requesting device of the first plurality of requesting devices;
verifying the received pre-authentication request using said first group shared secret;
receiving an authentication request comprising proof of knowledge of a secret shared exclusively between the authenticating device and the first requesting device; and
when the authentication request is determined to have been transmitted from said first requesting device, authenticating the first requesting device in response to the authentication request.

15. The authenticating device of claim 14, wherein the at least one processor is further configured to enable, if the authentication request is determined not to have been transmitted from any requesting device from which any verified pre-authentication request was transmitted, discarding the authentication request.

16. The authenticating device of claim 14, wherein the at least one processor is further configured to enable determining that the authentication request was transmitted from said first requesting device by determining that said authentication request and said pre-authentication request were transmitted from a same IP address.

17. The authenticating device of claim 14, wherein the pre-authentication request and the authentication request are comprised in a single message.

18. The authenticating device of claim 14, wherein the at least one processor is further configured to enable determining that the authentication request was transmitted from said first requesting device by determining that said authentication request comprises a token, the token previously being provided to said first requesting device in response to said verifying and being distinct from the exclusively shared secret.

19. The authenticating device of claim 14, wherein the at least one processor is further configured to enable determining that the authentication request was transmitted from said first requesting device by determining that said authentication request and said pre-authentication request comprise a same identifier.

20. The authenticating device of claim 14, wherein the at least one processor is further configured to enable:
establishing a secure channel between the authenticating device and the first requesting device in response to said pre-authentication request, the pre-authentication request comprising credentials from the first requesting device for initiating the secure channel; and
determining that the authentication request is received from said first requesting device by determining that said authentication request was transmitted over the secure channel.

21. The authenticating device of claim 14, wherein the pre-authentication request comprises an index of the first group shared secret and a hash comprising the first group shared secret.

22. The authenticating device of claim 14, wherein the pre-authentication request comprises a payload and a signature, the payload comprising an index of the first group shared secret, a time interval number and a random number derived from the time interval number, and the signature comprising a hash of the first group shared secret and said payload.

23. The authenticating device of claim 14, wherein the at least one processor is further configured to enable:
receiving a further pre-authentication request comprising at least a reference for the second group shared secret, the further pre-authentication request being transmitted from a further requesting device of the second plurality of requesting devices;
determining that the second group shared secret is invalid;
indicating to said further requesting device that the further pre-authentication request has failed when the second group shared secret is determined to be invalid;
receiving a subsequent pre-authentication request from said further requesting device, said subsequent pre-authentication request comprising at least a reference for a further group shared secret selected from said plurality of group shared secrets;
verifying the subsequent pre-authentication request using said further group shared secret, the further group shared secret being valid;
receiving a further authentication request comprising proof of knowledge of the secret shared exclusively between the authenticating device and the further requesting device; and
when the further authentication request is determined to have been transmitted from the further requesting device, authenticating the further requesting device in response to the authentication request.

24. A computer program product comprising a non-transitory computer readable medium bearing program code which, when executed by a processor of an authenticating device, causes the authenticating device to carry out the method of:
storing, prior to receiving any authorization requests, a plurality of group shared secrets in memory accessible to the authenticating device, the plurality of group shared secrets comprising at least a first group shared secret and a second group shared secret,
the first group shared secret being also stored in memory of each of a first plurality of requesting devices prior to transmission of any authorization request by any of the first plurality of requesting devices to the authenticating device;
the second group shared secret being also stored in memory of each of a second plurality of requesting devices prior to transmission of any authorization request by any of the second plurality of requesting devices to the authenticating device,
the first plurality of requesting devices and the second plurality of requesting devices each comprising different subsets of a set of requesting devices while also including at least one common requesting device from the set of requesting devices;
receiving a pre-authentication request comprising at least a reference for the first group shared secret of the plurality of group shared secrets, the pre-authentication request being transmitted from a first requesting device of the first plurality of requesting devices;
verifying, at the authenticating device, the received pre-authentication request using said first group shared secret;
receiving an authentication request comprising proof of knowledge of a secret shared exclusively between the authenticating device and the first requesting device; and when the authentication request is determined to have been transmitted from said first requesting device, authenticating the first requesting device in response to the authentication request.

* * * * *